April 26, 1927. 1,626,388
E. R. BURTNETT
INTERNAL COMBUSTION ENGINE
Filed Feb. 28, 1924  2 Sheets-Sheet 1
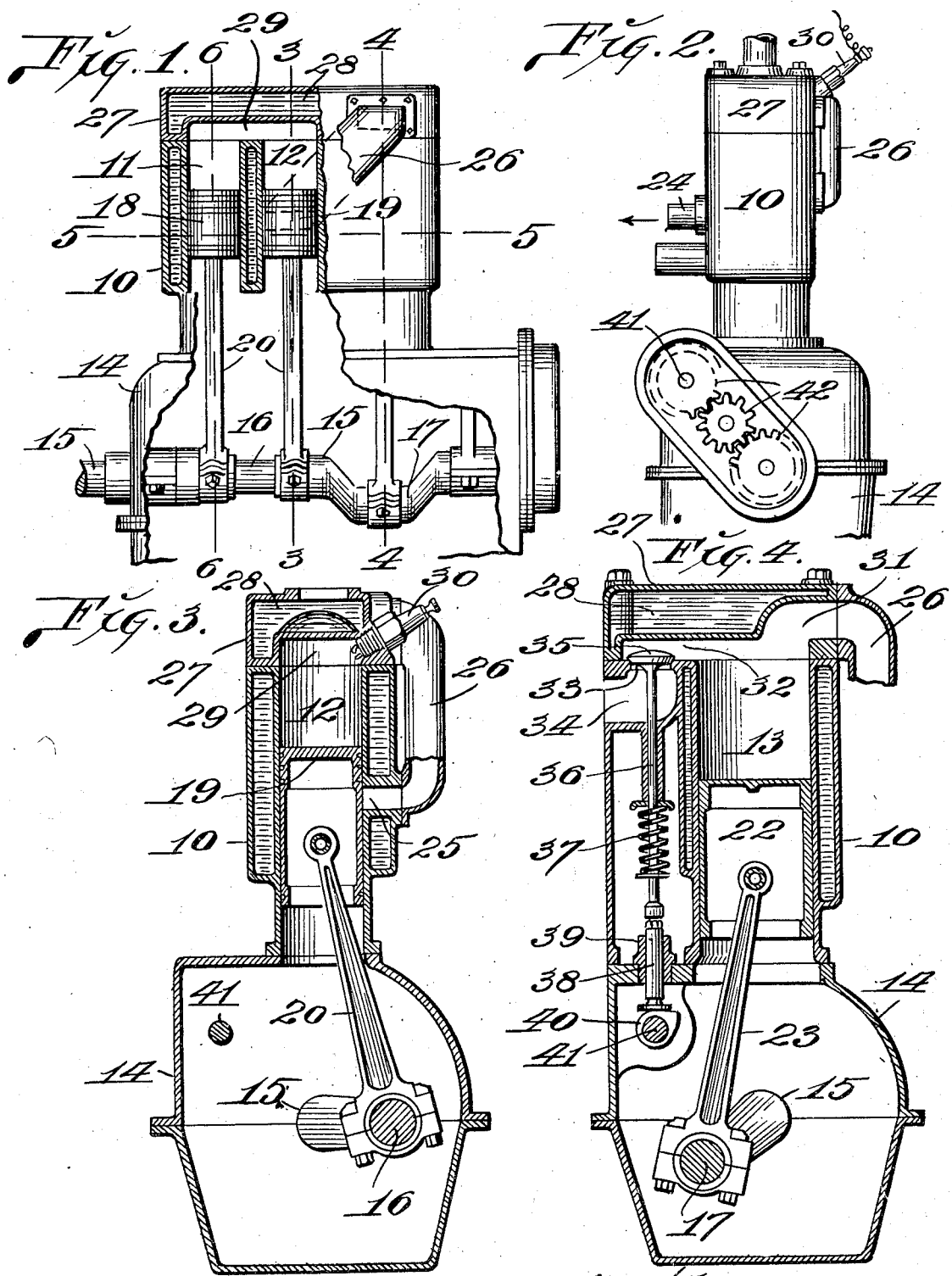
Inventor:
E. R. Burtnett.
By Martin P. Smith, Atty.

April 26, 1927.

E. R. BURTNETT

INTERNAL COMBUSTION ENGINE

Filed Feb. 28, 1924

Inventor:—
E. R. Burtnett,
By Martin C. Smith, atty.

Patented Apr. 26, 1927.

1,626,388

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed February 28, 1924. Serial No. 695,723.

My invention relates to an internal combustion engine of the two stroke cycle type, and has for its principal objects the provision of a relatively simple and practical engine structure wherein two combustion cylinders that are joined by a clearance chamber common to both, have combined therewith a pumping cylinder wherein gaseous fuel is compressed and inducted under pressure into the combustion cylinders, and to combine with said pumping cylinder a poppet type inlet valve that controls the admission of the gaseous fuel mixture to the pump cylinder, the use of such valve accomplishing the inlet function for a two-cycle engine practically the same as is accomplished in the conventional four-cycle engine, and such provision being in keeping with the present production methods of engine manufacturers.

The combining of a gaseous fuel inlet valve of the poppet type with a gaseous fuel pumping cylinder permits the construction of a two stroke cycle engine in which a constant inlet port can be maintained in admission function for the full period of the admission or suction stroke of the pump cylinder piston, thereby making possible the use of whatever inlet period lag in timing is deemed necessary by the engine designer for the greatest volumetric efficiency at high rotative engine speeds.

Further objects of my invention are to provide a two stroke cycle engine of the character referred to that will permit relatively high compressions to be accomplished and made use of without producing detonation, and its undesirable and destructive results, and, further, to provide an engine that has great strength and durability, is practically silent in operation, capable of being easily and cheaply produced and in which the port capacity is relatively large as compared to the volume of cylinder displacement.

With the foregoing and other objects in view, my invention consists in the features of construction and combination and arrangement of parts hereinafter more fully described and claimed, reference being had to the accompanying drawings, in which—

Figure 1 is a side elevational view of an engine of my improved construction with parts broken away and in vertical section;

Figure 2 is an end elevational view of my improved engine;

Figure 3 is an enlarged vertical section taken on the line 3—3 of Figure 1;

Figure 4 is an enlarged vertical section taken on the line 4—4 of Figure 1;

Figure 5:
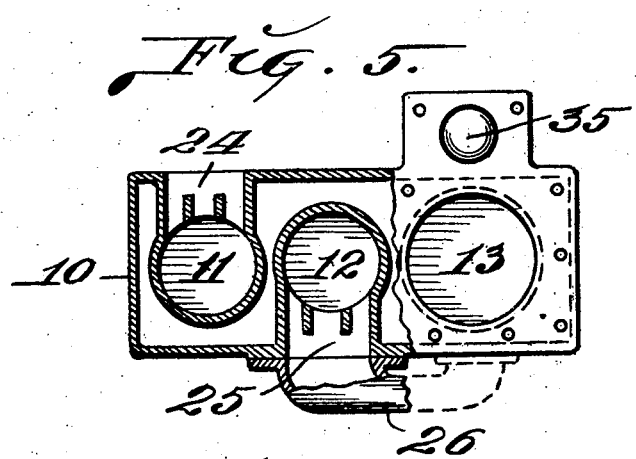
Figure 5 is a horizontal section taken on the line 5—5 of Figure 1.
Figure 6:
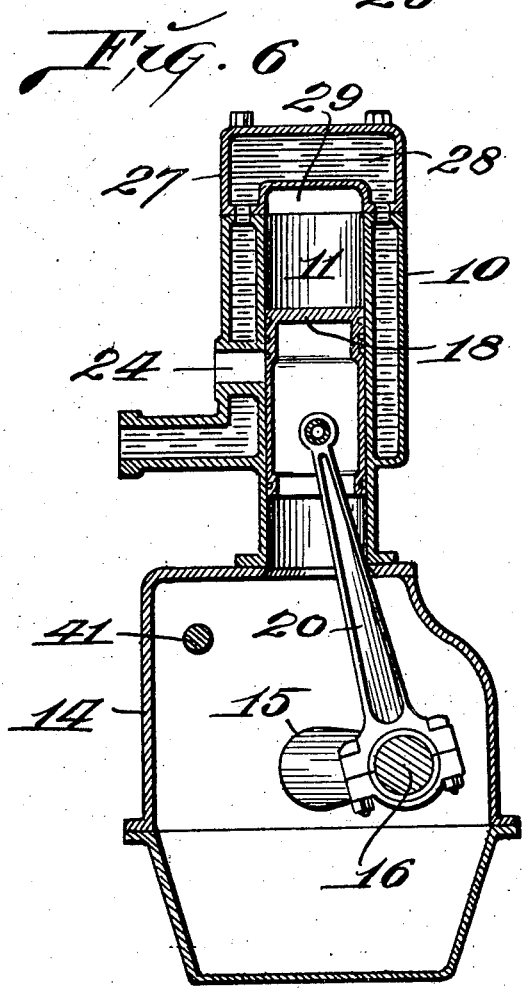
Figure 6 is an enlarged vertical section taken on the line 6—6 of Figure 1.

Referring by numerals to the accompanying drawings, which illustrate a practical embodiment of my invention, 10 designates a cylinder block, preferably of the water jacketed type, and in which is formed a pair of combustion chambers 11 and 12 and a gaseous fuel pumping or precompression chamber 13. These chambers are, as shown, preferably arranged in a row, with their axes parallel and occupying the same plane.

Block 10 surmounts a crank case 14, formed in two or more parts and provided with suitably arranged bearings for a crank shaft 15. This crank shaft has a crank 16 that is located beneath the combustion chambers 11 and 12 and with a crank 17 that is located beneath pumping chamber 13.

Crank 6 is approximately 225 degrees in advance of crank 17, in the direction of crank rotation.

Arranged for operation within chambers 11 and 12 are, respectively, pistons 18 and 19 and connecting said pistons and crank 16 are ordinary connecting rods 20.

Arranged for reciprocatory movement within pumping chamber 13 is a piston 22 that is connected to crank 17 by an ordinary connecting rod 23.

Formed through the wall of block 10 and communicating with the intermediate portion of chamber 11 is an exhaust port 24 that is wholly uncovered and open only when piston 18 is at the lower or outer end of its stroke.

Formed through the wall of block 10 and communicating with the intermediate portion of chamber 12 is a compressed gaseous fuel inlet port 25 that is wholly uncovered and open, only when the piston 19 is at the lower or outer end of its stroke and communicating with said port 25 is the lower end of an inclined gaseous fuel transfer duct 26.

Secured on top of block 10 is a head block 27 that has a cooling fluid circulation chamber 28, and formed in the underside thereof is a pocket or recess 29 that establishes communication between the upper ends of chambers 11 and 12 and said recess performing the functions of a common clearance chamber for the two combustion chambers as well as a combined compression, ignition, combustion and expansion chamber.

Seated in block 27 and preferably at a point above chamber 12 is a spark plug 30 and the inner ends of the electrodes thereof project into the chamber 29.

Formed in the underside of head block 29 and communicating with chamber 13 is a short outlet passageway 31 that leads through the side of said head block and communicates directly with the upper end of transfer duct 26.

Formed in the under side of the head block 27 and extending laterally from passageway 31 is a gaseous fuel inlet passageway 32, the outer end of which communicates with a port 33 that is formed at the upper inner end of the fuel inlet duct 34, which latter is formed in the upper portion of block 10 to the side of the pumping cylinder. Port 33 is provided on its upper edge with a seat for an upwardly opening poppet valve 35 that is carried on the upper end of a stem 36, the latter extending downward through suitable bearings and having associated therewith a spring 37 that normally holds said valve upon its seat.

The lower end of valve stem 36 rests on the upper end of a plunger 38 that operates in a suitable bearing 39 and said plunger bearing on the periphery of a cam 40 that is carried by a shaft 41. This shaft is journaled for rotation in suitable bearings in the crank case 14 and said shaft is driven at the same speed as crank shaft 15, preferably by means of a train of gearing 42 between the two shafts.

In the operation of my improved engine, cam 40 acting through plunger 38 and stem 36 unseats poppet valve 35, while the pumping piston 22 is moving downwardly and as a result gaseous fuel is drawn into the pumping chamber 13 from a carburetor or other source of supply, said gaseous fuel passing through duct 34, port 33 and duct 32.

As pumping piston 22 passes low center fuel inlet control valve 35 closes and on the succeeding upward stroke of piston 22 the gaseous fuel charge is compressed in the upper portion of chamber 13 and in transfer duct 26. As pistons 18 and 19 approach low center following their downward travel, exhaust port 24 and inlet transfer port 25 are simultaneously opened, although as a matter of fact the exhaust port 24 is uncovered slightly in advance of the uncovering of port 25, due to the fact that the exhaust port is slightly wider than the fuel inlet port and following the opening of said gaseous fuel inlet port 25 the compressed charge of gaseous fuel will rush into and upwardly through chamber 12, thence through the common clearance chamber 29 and thence downwardly through chamber 11, driving before it the products of combustion of the previously ignited fuel charge and said products of combustion will pass out through exhaust port 24. On the succeeding upward movement of the pistons 18 and 19 the ports 24 and 25 will be covered and closed, and during the remainder of the upward travel of said pistons the gaseous fuel charge drawn into the chambers 11 and 12, and whatever products of combustion remain in said chambers will be compressed within the common clearance chamber 29. At the point of highest compression or as the pistons 18 and 19 pass their high centers, a spark is produced between the terminals of the electrodes of plug 30, thereby igniting the compressed gaseous fuel charge and the expansion following combustion will act on pistons 18 and 19 to drive the same downward on their power stroke and the power and motion thus produced will be transmitted through the connecting rods 20 directly to crank shaft 15.

Thus, it will be seen that I have provided a relatively simple, strong, rugged and durable two stroke cycle internal combustion engine unit that embodies a pair of connected combustion cylinders, a gaseous fuel pumping cylinder and a poppet valve for controlling the admission of gaseous fuel into the pumping cylinder and which engine may be operated under high compression with economy and efficiency and without producing detonation and its deleterious results.

It will be understood that various changes in the size, form and construction of the various parts of my improved internal combustion engine may be made and substituted for those herein shown and described without departing from the spirit of my invention, the scope of which is set forth in the appended claims.

I claim as my invention:

1. In a two stroke cycle internal combustion engine, a unit of three cylinders, two of which function as combustion cylinders and the third functioning as a charge pumping cylinder, a block arranged on the head ends of said cylinders, said block being provided with a recess that connects and provides a common compression and combustion clearance chamber for the chambers within the combustion cylinders, said block being provided with a recess that constitutes an extension for the head end of the chamber in the pumping cylinder, said recess being provided on opposite sides with lateral extensions, one of which functions as a gaseous fuel inlet duct and the other as a pumped charge volume outlet duct, a mechanically operated poppet valve normally closing a port in the charge volume inlet duct, a transfer duct leading from the pumped charge volume outlet duct to an inlet port formed through the wall of the combustion cylinder that is immediately adjacent to the pumping cylinder, the other one of the combustion cylinders being provided with an exhaust port, pistons arranged for operation within the chambers of the three cylinders, a two throw crank shaft, separate connections from the pistons within the two combustion cylinders to one throw of the crank shaft and a separate connection from the piston in the charge volume pumping cylinder to the other one of the two throws of the crank shaft.

2. In a two stroke cycle internal combustion engine unit, three cylinders, two of which are adapted to combustion and joined at their head ends by a common compression and combustion clearance chamber, exhaust ports formed in the wall of one of said two combustion cylinders, inlet ports formed in the wall of the other of the two combustion cylinders, the third cylinder of the unit of three cylinders being adapted to charge pumping, a crank shaft having two crank throws, pistons within each of the three cylinders, connections between the pistons in the two combustion cylinders and one of the two crank throws of said crank shaft, a separate connection between the piston within the third cylinder and the other one of the two crank throws of the crank shaft, said last mentioned crank throw being arranged in relation to the crank throw to which the two pistons of the two combustion cylinders are connected, so as to cause the piston within the pumping cylinder to reach head end dead center at the time the piston within the combustion cylinder having the inlet ports arranged in its wall has moved sufficiently past crank end dead center to close said inlet ports, the head end of the chamber in the pump cylinder having a lateral extension, there being a fuel charge admission port at the outer end of said lateral extension, an admission poppet valve normally closing said admission port, means whereby the said poppet valve is opened mechanically immediately after the piston within the pumping cylinder has reached head end dead center and held open during the period of each suction stroke of the pumping cylinder piston and a charge volume transfer duct leading from the upper or head end of the pumping chamber to the inlet ports in one of the combustion chambers.

In testimony whereof I affix my signature.

EVERETT R. BURTNETT.